No. 716,347. Patented Dec. 16, 1902.
F. H. RICHARDS.
PLAYING BALL.
(Application filed Oct. 3, 1902.)
(No Model.)
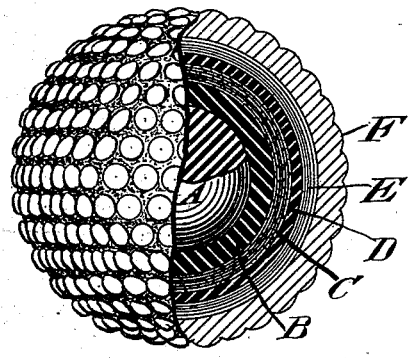
Witnesses:
J. E. Davidson.
B. C. Stickney.
Inventor:
F. H. Richards.

UNITED STATES PATENT OFFICE.

FRANCIS H. RICHARDS, OF HARTFORD, CONNECTICUT, ASSIGNOR TO THE KEMPSHALL MANUFACTURING COMPANY, OF ARLINGTON, NEW JERSEY, A CORPORATION OF NEW JERSEY.

PLAYING-BALL.

SPECIFICATION forming part of Letters Patent No. 716,347, dated December 16, 1902.

Application filed October 3, 1902. Serial No. 125,739. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Playing-Balls, of which the following is a specification.

This invention relates to golf-balls; and its object is to provide at minimum cost a ball of high quality and excellent flying power.

In the accompanying drawings, A indicates a hard and springy spherical center piece, of button-stock or material used in the manufacture of certain buttons and the like, and consists of a compound of shellac with other suitable material. Said center piece is inclosed in a soft-rubber shell B, preferably of substantial thickness and in a state of tension or expansion, the button-stock being introduced by injection in the manner substantially set forth in the patent granted to me March 25, 1902, No. 696,352. Before injecting the center piece I wind the rubber sphere B with numerous layers of linen or cotton thread, although in some cases tape may be used, and these windings form, preferably, a substantial layer C. By the injection of the material of the center piece the layer B thereon is not only expanded, but the windings C are also stretched or at least rendered very taut, so that their full value as an aid in the flight of the ball is secured. Upon the windings C, I apply another layer of soft rubber D. This may consist either of windings of rubber thread or windings of acid-cured sheet-rubber, or it may be in the form of undersized segments of molded rubber stretched over the layer C and cemented thereto. Over the said outer rubber layer I wind thin strips of strong paper to make a thick layer E, said strips being preferably glued together as they are wound on. In winding the paper I use considerable tension, so that the rubber layer D is subjected to considerable pressure, and hence is rendered more active, thus contributing to the flying power of the ball. By winding the strips very tight and gluing them together a solid layer is formed substantially all parts whereof are under longitudinal tension, thus making a very springy shell. Upon said paper layer I apply a cover F, of gutta-percha, which preferably holds its contents under a high degree of compression.

It will be understood that the two separated layers of rubber B and D are of importance, not only by virtue of their inherent elasticity, but also because they separately afford yielding backings for the springy layers C and E, which hence are enabled when the ball receives a blow to change their general form to some extent, and as they are very active in regaining their normal spherical form (owing partly to the solidity of the contents of each of said layers) the flying power of the ball is vastly improved. It will also be seen that the rubber layer B is held under pressure by the windings C thereon and that the rubber layer D is held under pressure by the windings E, whereby the activity of the rubber itself is increased while the use of unduly thick layers of either rubber or fibrous material is avoided.

Having described my invention, I claim—

1. A golf-ball comprising a rubber shell overwound with tense linen thread and containing a center piece of injected shellac compound, a layer upon said windings consisting of tense windings of pure sheet-rubber, a layer upon said rubber windings consisting of tense windings of paper strip glued together, and a cover of gutta-percha.

2. A golf-ball comprising a rubber shell overwound with thread and containing a center piece of springy material, a layer of rubber upon said windings, a layer upon said rubber consisting of tense windings of paper strip, and a cover.

3. A golf-ball comprising a rubber shell overwound with tense thread and containing a hard center piece, a layer of rubber upon said windings, a layer upon said rubber consisting of tense windings of paper strip glued together, and a cover of gutta-percha.

4. A golf-ball comprising a rubber sphere, a layer of windings thereon, a layer of rubber upon said windings, a layer of windings upon said rubber layer, at least one of said layers of windings consisting of tense paper strips, and a cover.

5. A golf-ball comprising a rubber sphere, a layer of windings thereon, a layer of rubber upon said windings, a layer of windings upon said rubber layer, at least one of said layers of windings consisting of tense paper strips glued together, and a cover of gutta-percha.

6. A playing-ball comprising a center piece, a layer thereon consisting of tense windings of narrow paper strips, said windings being glued facewise to one another, and a cover.

7. A golf-ball comprising a center piece, tense windings of pure sheet-rubber thereon, a layer upon said rubber windings consisting of tense windings of paper strip, and a cover of gutta-percha.

8. A golf-ball comprising a rubber sphere, windings of linen thread thereon, a layer upon said windings consisting of tense windings of pure sheet-rubber, a layer upon said rubber windings consisting of tense windings of paper strip glued together, and a cover of gutta-percha.

9. A golf-ball comprising two rubber spheres, windings of thread upon one of said spheres, a layer upon the other of said spheres consisting of tense windings of paper strip, and a cover of gutta-percha.

10. A golf-ball comprising two rubber spheres, windings of thread upon one of said spheres, a layer upon the other of said spheres consisting of tense windings of paper strip glued together, and a cover of gutta-percha.

Signed at 9 to 15 Murray street, New York, N. Y., this 2d day of October, 1902.

FRANCIS H. RICHARDS.

Witnesses:
FRED J. DOLE,
JOHN O. SEIFERT.